(12) United States Patent
Wang et al.

(10) Patent No.: US 11,092,076 B2
(45) Date of Patent: Aug. 17, 2021

(54) TURBINE ENGINE WITH COMBUSTOR

(71) Applicant: GENERAL ELECTRIC COMPANY, Schenectady, NY (US)

(72) Inventors: Anquan Wang, Mason, OH (US); Hojjat Nasr, West Chester, OH (US); Craig Alan Gonyou, Blanchester, OH (US); Michael Anthony Benjamin, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 15/823,732

(22) Filed: Nov. 28, 2017

(65) Prior Publication Data

US 2019/0162117 A1 May 30, 2019

(51) Int. Cl.
| | | |
|---|---|---|
| *F02C 7/18* | (2006.01) | |
| *F23R 3/00* | (2006.01) | |
| *F23R 3/28* | (2006.01) | |
| *F23R 3/04* | (2006.01) | |
| *F23R 3/10* | (2006.01) | |
| *F02C 3/04* | (2006.01) | |

(52) U.S. Cl.
CPC ................ *F02C 7/18* (2013.01); *F23R 3/002* (2013.01); *F23R 3/04* (2013.01); *F23R 3/10* (2013.01); *F23R 3/28* (2013.01); *F02C 3/04* (2013.01); *F05D 2220/32* (2013.01); *F05D 2240/35* (2013.01); *F23R 2900/03042* (2013.01); *F23R 2900/03044* (2013.01)

(58) Field of Classification Search
CPC .... F23R 3/002; F23R 3/04; F23R 3/10; F23R 3/28; F23R 3/60; F02C 7/18; F02C 3/04
See application file for complete search history.

(56) References Cited

U.S. PATENT DOCUMENTS

| | | | | |
|---|---|---|---|---|
| 5,142,871 A | * | 9/1992 | Lampes | F23R 3/10 60/756 |
| 5,241,827 A | | 9/1993 | Lampes | |
| 5,261,223 A | | 11/1993 | Foltz | |
| 5,265,425 A | * | 11/1993 | Howell | F23R 3/14 60/736 |
| 5,279,127 A | | 1/1994 | Napoli | |
| 5,329,761 A | * | 7/1994 | Ablett | F23R 3/10 60/746 |
| 5,483,794 A | | 1/1996 | Nicoll et al. | |
| 5,765,376 A | * | 6/1998 | Zarzalis | F23R 3/10 60/748 |
| 6,266,961 B1 | | 7/2001 | Howell et al. | |
| 6,286,317 B1 | * | 9/2001 | Burrus | F23R 3/06 60/750 |
| 6,334,298 B1 | * | 1/2002 | Aicholtz | F23R 3/283 60/750 |
| 6,581,285 B2 | | 7/2003 | Emilianowicz | |
| 7,007,481 B2 | | 3/2006 | McMasters | |

(Continued)

*Primary Examiner* — Craig Kim
(74) *Attorney, Agent, or Firm* — McGarry Bair PC

(57) ABSTRACT

A combustor assembly for a turbine engine and method for cooling a portion of the combustor assembly, the combustor assembly comprising a combustor liner defining a combustion chamber with an inlet and an outlet, a fuel dome located in the inlet and having a wall adjacent at least a portion of the combustor liner, and a deflector overlying and spaced from at least a portion of the wall.

20 Claims, 5 Drawing Sheets

(56) References Cited

U.S. PATENT DOCUMENTS

| | | | |
|---|---|---|---|
| 7,770,397 B2* | 8/2010 | Patel | F01D 25/12 |
| | | | 60/752 |
| 7,827,800 B2* | 11/2010 | Stastny | F23R 3/002 |
| | | | 60/39.11 |
| 7,861,530 B2* | 1/2011 | Hawie | F23R 3/002 |
| | | | 60/752 |
| 8,091,367 B2 | 1/2012 | Alkabie | |
| 8,171,736 B2 | 5/2012 | Hawie et al. | |
| 8,938,970 B2 | 1/2015 | Gerendas et al. | |
| 9,134,028 B2 | 9/2015 | Stastny et al. | |
| 10,197,278 B2* | 2/2019 | Bloom | F23R 3/007 |
| 2006/0042257 A1* | 3/2006 | Stastny | F23R 3/50 |
| | | | 60/772 |
| 2009/0000303 A1* | 1/2009 | Patel | F23R 3/002 |
| | | | 60/752 |
| 2015/0338103 A1 | 11/2015 | Leglaye et al. | |
| 2016/0230993 A1 | 8/2016 | Dai et al. | |
| 2017/0045228 A1 | 2/2017 | Reiter et al. | |
| 2017/0130651 A1 | 5/2017 | Nasr et al. | |
| 2018/0274780 A1* | 9/2018 | Kim | F23R 3/10 |

* cited by examiner

TURBINE ENGINE WITH COMBUSTOR

BACKGROUND OF THE INVENTION

This disclosure relates generally to a turbine engine with a combustor and more particularly to an inlet of the combustor including a fuel dome having a wall and a combustor liner having an inner surface. The fuel dome can also include a deflector spaced from the wall. Cooling air can be introduced to the inner surface of the combustor liner proximate the deflector.

Turbine engines are driven by a flow of combustion gases passing through the engine onto a multitude of rotating turbine blades. A combustor can be provided within the turbine engine and is fluidly coupled with a turbine into which the combusted gases flow.

The combustor can be formed from a combustor liner. The combusted gases flowing over the combustion liner cause heating of the combustion liner and therefore the combustion liner requires cooling during operation. A "cooling nugget", as is conventionally called in the art, can be provided in the combustion liner proximate the fuel dome, to cool the combustion liner. Eliminating the "cooling nugget" by providing an alternative to the "cooling nugget" can increase efficiency and increase a cost benefit for manufacturing.

BRIEF DESCRIPTION OF THE INVENTION

In one aspect, the disclosure relates to a combustor assembly for a turbine engine, the combustor assembly comprising a combustor liner defining a combustion chamber with an inlet and an outlet, a fuel dome located in the inlet and having a wall adjacent at least a portion of the combustor liner, a deflector overlying and spaced from at least a portion of the wall and the combustor liner to define a deflector chamber opening onto the combustor liner, and at least one cooling opening provided in the wall and opening into the deflector chamber.

The combustor assembly wherein the deflector terminates in a tip spaced from the combustor liner to form a gap between the tip and the combustor liner that defines the outlet for the deflector chamber.

The combustor assembly further comprising a gap cooling opening in the wall, with the gap cooling opening having a centerline passing through the gap.

The combustor assembly further comprising a staggered cooling opening in the wall, with the staggered cooling opening having a centerline that is locally non-parallel with the centerline of the gap cooling opening.

The combustor wherein at least one of the cooling opening, gap cooling opening, or staggered cooling opening have a diffuser shaped outlet.

The combustor assembly wherein at least a portion of the fuel dome defines a cooling plenum upstream of the wall and a baffle within the cooling plenum and defining an intermediary plenum between the cooling plenum and the combustion chamber wherein at least one baffle opening is in the baffle.

The combustor assembly wherein the wall and the deflector form the same acute angle.

The combustor assembly wherein the at least one cooling opening is multiple cooling openings in the wall that have outlets opening into the deflector chamber.

The combustor assembly wherein the combustor liner and fuel dome are annular about a centerline of the turbine engine.

In another aspect, the disclosure relates to a turbine engine comprising an engine core having a compressor, a combustor assembly, and a turbine, arranged in a serial, axial flow relationship, a combustor liner at least partially defining the combustor assembly and having a combustion chamber with an inlet and an outlet, a fuel dome located in the inlet and having a wall adjacent at least a portion of the combustor liner, a deflector overlying and spaced from at least a portion of the wall and the combustor liner to define a deflector chamber opening onto the combustor liner, and at least one cooling opening provided in the wall and opening into the deflector chamber.

The turbine engine wherein the deflector terminates in a tip spaced from the combustor liner to form a gap between the tip and the combustor liner that defines the outlet for the deflector chamber.

The turbine engine further comprising a gap cooling opening in the wall, with the gap cooling opening having a centerline passing through the gap.

The turbine engine further comprising a staggered cooling opening in the wall, with the staggered cooling opening having a centerline that is locally non-parallel with the centerline of the gap cooling opening.

The turbine engine wherein at least one of the cooling opening, gap cooling opening, or staggered cooling opening have a diffuser shaped outlet.

The turbine engine wherein at least a portion of the fuel dome defines a cooling plenum upstream of the wall and a baffle upstream within the cooling plenum and defining an intermediary plenum between the cooling plenum and the combustion chamber wherein at least one baffle opening is in the baffle.

The turbine engine wherein the at least one cooling opening is multiple cooling openings in the wall that have outlets opening into the deflector chamber.

In yet another aspect, the disclosure relates to a method of cooling an inner surface of a combustor liner defining a combustion chamber supplied fuel by a fuel dome, the method comprising emitting cooling air into the combustion chamber from a cooling opening formed in the fuel dome, and deflecting the emitted cooling air along the inner surface.

The method further comprising turning the cooling air to flow within a deflector chamber defined by a deflector spaced from the fuel dome.

The method wherein the emitting cooling air further comprises emitting cooling air through a chamber outlet to form a cooling film along the inner surface.

The method further comprising impinging cooling air onto a wall of the fuel dome through at least one baffle opening.

DESCRIPTION OF EMBODIMENTS OF THE INVENTION

Figure 1:
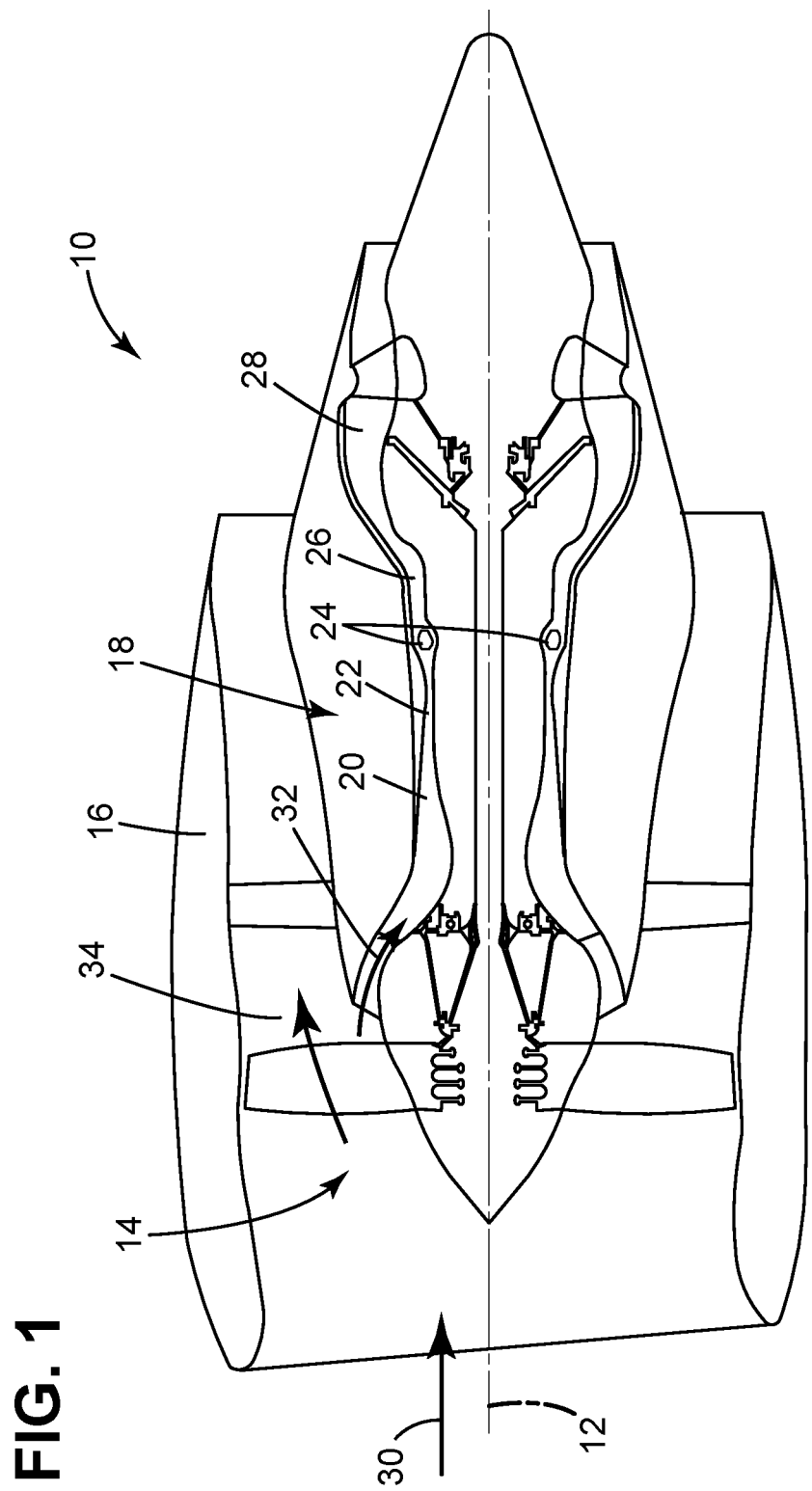
FIG. 1 is a schematic view of a turbine engine assembly including a combustor assembly.

Aspects of the disclosure described herein are directed to a combustor having a combustor liner, and in particular a fuel dome for the combustor, the fuel dome including a wall with cooling openings for forming a cooling film on the combustor liner. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an exemplary turbine engine assembly 10 having a longitudinal axis defining an engine centerline 12. A fan assembly 14, a nacelle 16, and a turbine engine core 18 can be included in the turbine engine assembly 10.

The turbine engine core 18 includes a low pressure compressor 20, a high pressure compressor 22, a combustor assembly 24, a high pressure turbine 26, and a low pressure turbine 28 arranged in a serial, axial flow relationship.

In operation, air 30 flows through the fan assembly 14 and a first portion 32 of the airflow is channeled through compressors 20, 22 wherein the first portion 32 of the airflow is further compressed and delivered to the combustor assembly 24. Hot products of combustion (not shown) from the combustor assembly 24 are utilized to drive turbines 26, 28 and thus produce engine thrust. A second portion 34 of the airflow discharged from fan assembly 14 is utilized to bypass around the turbine engine core 18.

Figure 2:
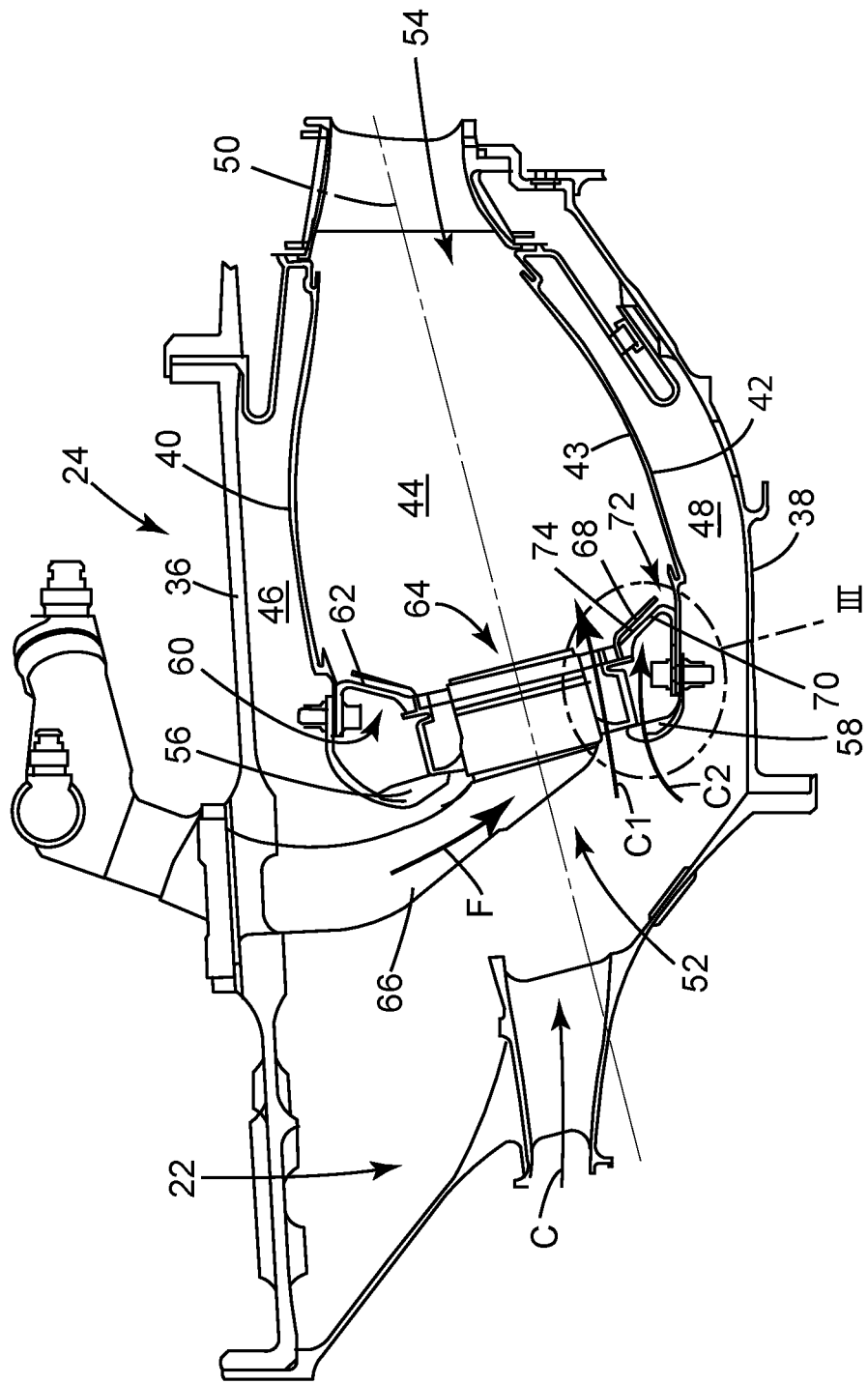
FIG. 2 is a cross-sectional view of the combustor assembly of FIG. 1 according to an aspect of the disclosure discussed herein.

FIG. 2 is a schematic cross-sectional view of an exemplary combustor assembly 24 that can be used with the turbine engine core 18. The combustor assembly 24 can include an outer combustor casing 36 and an inner combustor casing 38. A combustor liner, which can be an outer liner 40 and an inner liner 42, is disposed between the outer and inner combustor casings 36, 38. Outer and inner liners 40, 42 are spaced radially from each other such that a combustion chamber 44 is defined therebetween having an inner surface 43. Outer liner 40 and outer combustor casing 36 form an outer passage 46 therebetween, and inner liner 42 and inner combustor casing 38 form an inner passage 48 therebetween.

The combustion chamber 44 can extend along a longitudinal axis 50 from a combustor inlet 52 to a combustor outlet 54. At least one cowl, illustrated as an outer cowl 56 and an inner cowl 58, can at least partially define the combustor inlet 52 and is coupled to upstream ends of outer and inner liners 40, 42, respectively.

The combustor inlet 52 can include a fuel dome 60 extending radially between, and is coupled to, upstream ends of the outer and inner liners 40, 42. The fuel dome 60 includes a wall 62 adjacent at least a portion of the outer and inner liners 40, 42. At least one fuel injector 66 is coupled to the wall 62 to define a dome inlet 64. A deflector 68, which can be an annular deflector with respect to the longitudinal axis 50, circumscribes the at least one dome inlet 64 and is spaced from the wall 62 to define a deflector chamber 70 therebetween.

Compressed fluid (C) exits the high pressure compressor 22 and enters the combustor assembly 24 at combustor inlet 52. A first portion of compressed fluid (C1) can flow through the combustor inlet 52 to support combustion within the combustion chamber 44. Fuel (F) from the fuel injector 66 and compressed fluid (C1) are mixed together and the resulting fuel/air mixture is discharged into the combustion chamber 44. A second portion of the compressed fluid (C2) can enter the combustor chamber 44 via the at least one cooling opening 74, flow through the deflector chamber 70, and out of the outlet 72 to facilitate cooling outer and inner liners 40, 42. It is further contemplated that compressed fluid (C) can flow through outer and inner passages 46, 48 and enter the combustion chamber 44 via dilution holes in the outer and inner liners 40, 42.

It should be appreciated that the term "fluid" as used herein includes any material or medium that flows, including, but not limited to, gas and air. It should be further understood that the combustor assembly 24 can be one of a plurality of combustor assemblies circumferentially arranged about the engine centerline 12 such that the longitudinal axis 50 is radially spaced from and coaxial with the engine centerline 12. Therefore parts of the combustor assembly 24 as described herein can be annular with respect to the engine centerline 12. By way of non-limiting example, the outer and inner liners 40, 42, the outer and inner cowls 56, 58, and the wall 62 can all be annular with respect to the engine centerline 12. It is further contemplated that a plurality of fuel injectors can be coupled to the wall 62 in circumferential arrangement about the engine centerline 12. Furthermore, in the disclosure discussed herein, the combustor assembly 24 depicts a single combustor. Alternatively, combustor assembly 24 can include any other combustor, including, but not limited to a double combustor.

Figure 3:
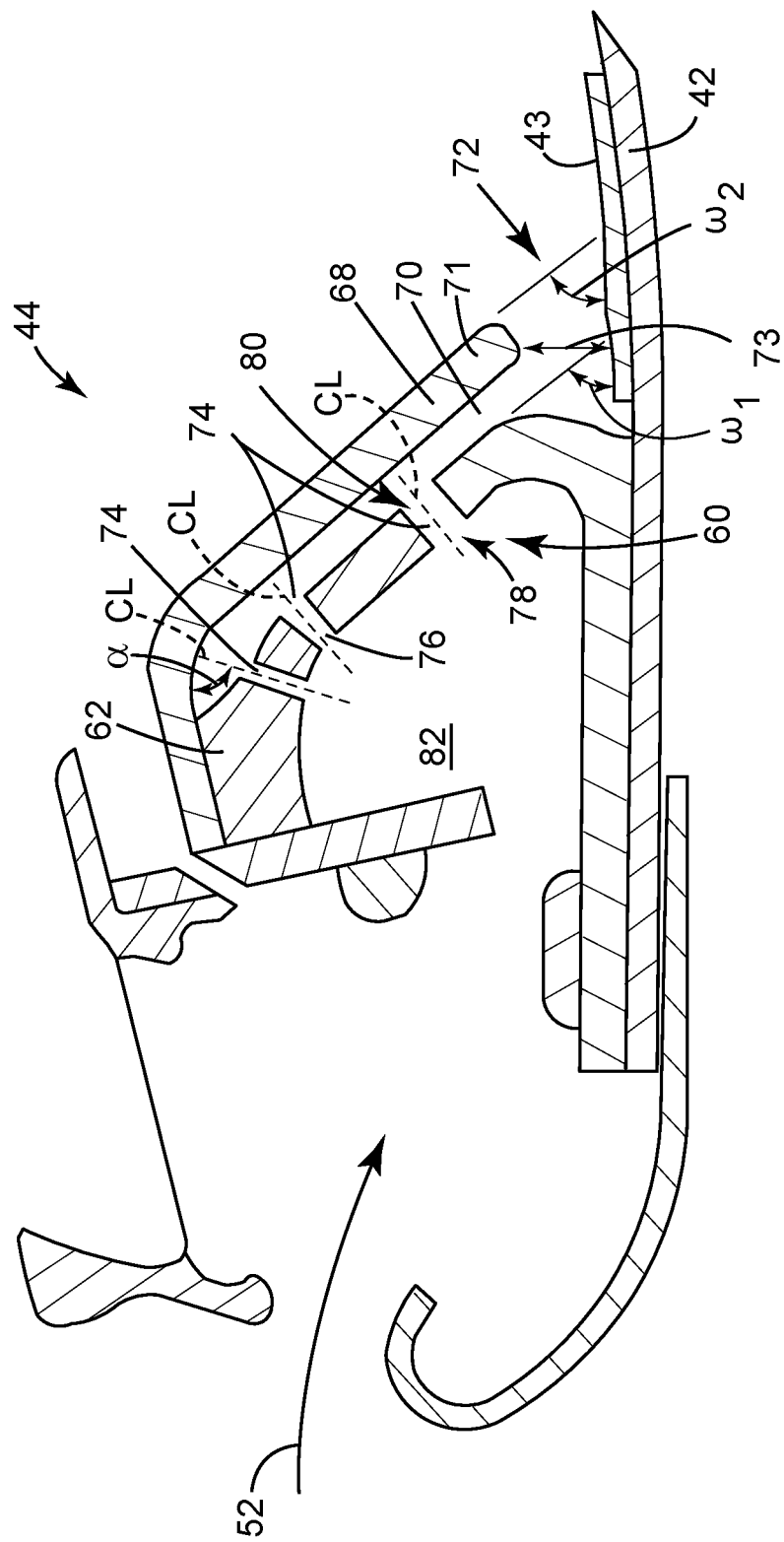
FIG. 3 is an enlarged view of a cooling plenum of the combustor assembly of FIG. 2 according to an aspect of the disclosure discussed herein.

Turning to FIG. 3, an enlarged portion indicated by III of FIG. 2 of the fuel dome 60 is illustrated in more detail. It should be understood that while a portion of the fuel dome 60 proximate the inner liner 42 is illustrated, the same features can be implemented at the portion of the fuel dome 60 proximate the outer liner 40.

The deflector chamber 70 can extend radially outward, with respect to longitudinal axis 50, from the dome inlet 64 toward the outer and inner liners 40, 42. The deflector chamber 70 terminates in a chamber outlet 72 defining an opening onto the inner surface 43 of the outer and inner liners 40, 42. The deflector 68 in combination with the outer or inner liner 40, 42 defines the outlet 72. At least one cooling opening 74 can be provided within the wall 62 fluidly coupling the combustor inlet 52 to the deflector chamber 70.

As illustrated, it can more be seen that the deflector chamber 70 is defined by the space between the deflector 68 and the wall 62. The deflector 68 terminates in a tip 71 spaced from the inner liner 42 to form a gap 73 between the tip 71 and the inner liner 42 that defines the outlet 72 for the deflector chamber 70. The gap 73 can vary in size. The maximum gap 73 is determined from a minimum prescribed bulk velocity through the gap 73, and the minimum gap 73 is determined from a maximum prescribed bulk velocity through the gap 73 or from a minimum producible gap 73. Additionally, the flow exiting gap 73 should not have a high enough momentum to appreciably modify the flow streamlines emanating from a main combustor swirl flow (not illustrated).

An extension of a line tangent to the wall 62 can form a local angle $\omega_1$ with the inner liner 42. An extension of a line tangent to the deflector 68 can form a second local angle $\omega_2$ with the inner liner 42. It is contemplated that both local angles on, $\omega_2$ are acute and can range from 40° to 50°. It is further contemplated that the first local angle $\omega_1$ is equal to the second local angle $\omega_2$.

The at least one cooling opening 74 is defined by a connecting passage 76 extending through the wall 62. The connecting passage 76 extends along a centerline (CL) from an inlet 78 to an outlet 80. The centerline (CL) can intersect with the deflector 68 at an intersection angle $\alpha$. By way of non-limiting example, the intersection angle $\alpha$ is a 90° angle, and can range from 30° to 120°.

The at least one cooling opening 74 can be multiple cooling openings having multiple connecting passages. It is further contemplated that the at least one cooling opening 74 can be multiple rows of cooling openings, illustrated as three rows of cooling openings 74. While illustrated as three rows of cooling openings, it should be understood that the at least one cooling opening 74 can be any number of rows or columns of cooling openings including one or more.

It should be noted, that a cooling hole such as a "cooling nugget", as is conventionally called in the art, is not provided in the combustion liner proximate the fuel dome, as is typically done to try and initiate a cooling flow along the inner surface of the combustion liner. Instead, the at least one cooling opening 74 in combination with the deflector chamber 70 are used and can serve to replace both the apparatus and function of the "cooling nugget". It is found that the cooling opening 74 and deflector chamber 70 better form a cooling flow along the inner surface of the combustion liner.

Figure 4:
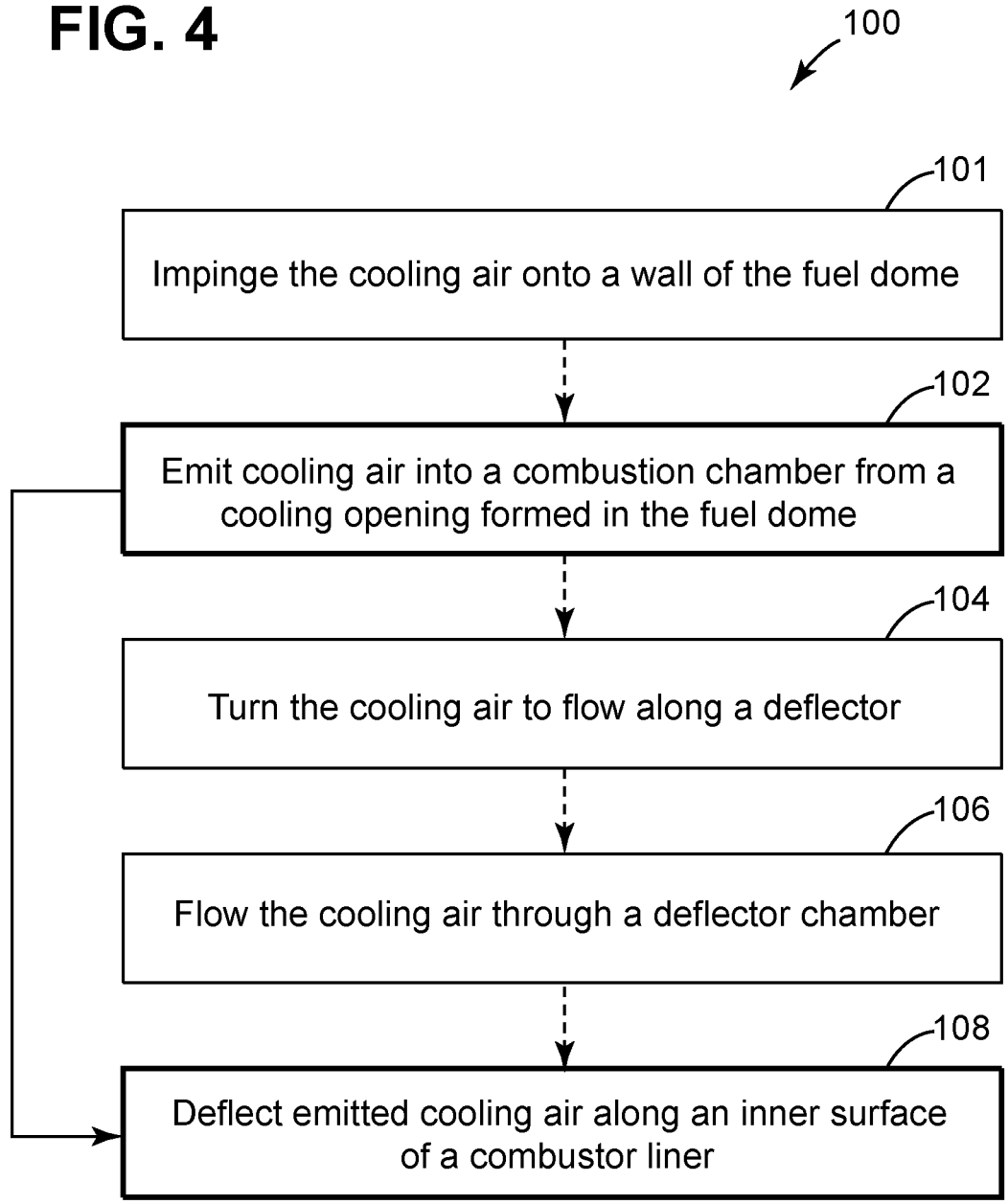
FIG. 4 is the same enlarged view of FIG. 3 illustrating a method of cooling an inner surface of the combustor assembly.
Figure 7:
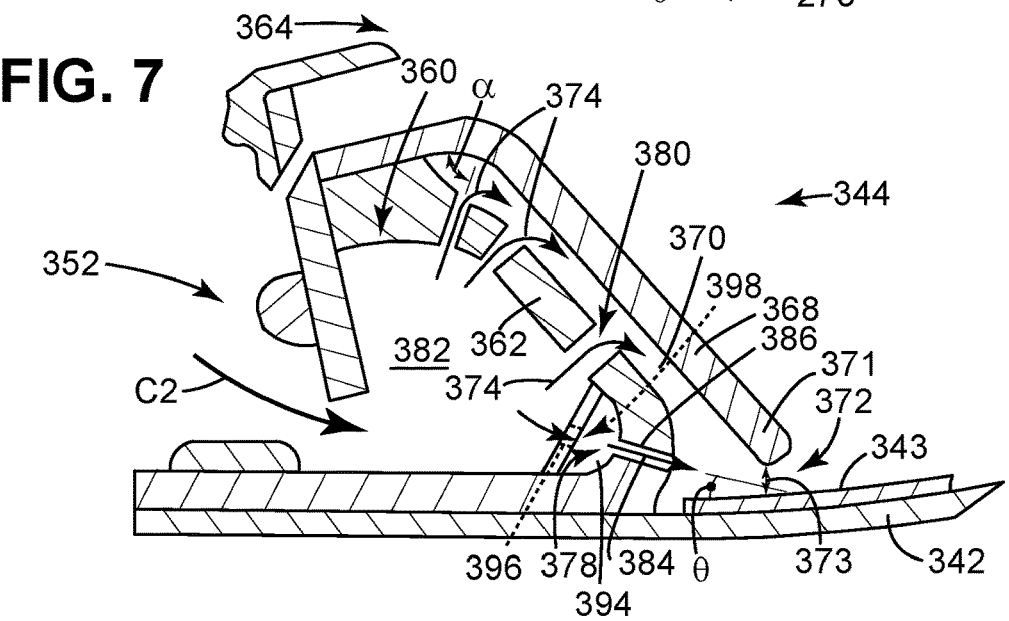
FIG. 7 is an enlarged view of a portion of the combustor assembly of FIG. 2 according to yet another aspect of the disclosure discussed herein.

Turning to FIG. 4, a method 100 of cooling the inner surface 43 of the combustion chamber 44 includes emitting cooling air at 102 by way of non-limiting example the second portion of compressed fluid (C2), into the combustion chamber 44 from the at least one cooling opening 74. The method can include at 102 turning the cooling air (C2) to flow along the deflector 68 and at 104 flowing the cooling air (C2) through the deflector chamber 70. At 104 the emitted cooling air (C2) is deflected along the inner surface 43 of the combustion chamber 44. It is also contemplated that the cooling air (C2) can be emitted through the chamber outlet 72 and onto the inner surface 43 to form a cooling film. At 101, it is further contemplated that prior to emitting the cooling air, the cooling air can be impinged onto the wall 62 as illustrated in FIG. 7.

Figure 5:
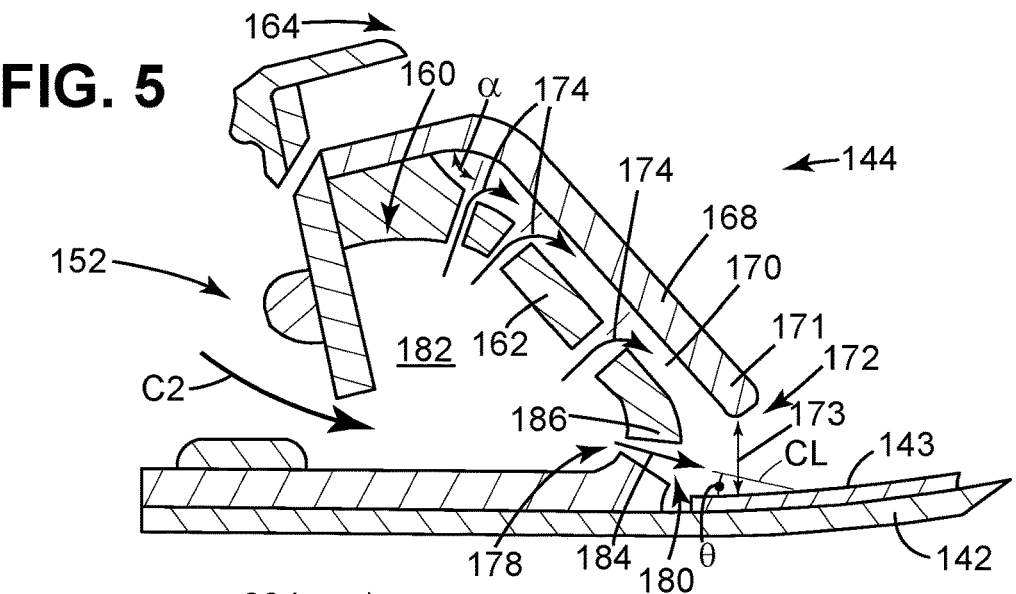
FIG. 5 is an enlarged view of a portion of the combustor assembly of FIG. 2 according to another aspect of the disclosure discussed herein.

FIG. 5 is an enlarged portion of FIG. 2 with a fuel dome 160 according to another aspect of the disclosure discussed herein. The fuel dome 160 is substantially similar to the fuel dome 60 of FIG. 3. Like parts will therefore be identified with like numerals increased by 100, with it being understood that the description of the like parts of the fuel dome 60 applies to the fuel dome 160 unless otherwise noted.

A wall 162 of the fuel dome 160 terminates at an inner surface 143 of an inner liner 142 to define a rounded end 186 of a cooling plenum 182. A deflector 168 extends outward from a dome inlet 164 and is spaced from the wall 162 to define a deflector chamber 170. Cooling openings 174 fluidly connect the cooling plenum 182 to the deflector chamber 170 through the wall 162. The deflector chamber 170 terminates in a chamber outlet 172 proximate a gap 173. The gap 173 is formed between a tip 171 of the deflector 168 and the inner surface 143 of the inner liner 142.

A gap cooling opening 184 is formed at the rounded end 186 of the cooling plenum 182. The gap cooling opening 184 defines a centerline (CL) that passes through the gap 173 to form an inner surface angle $\theta$ with the inner surface 143 of the inner liner 142. The inner surface angle $\theta$ is an acute angle ranging from 0° to 90°, and is preferably between 0° and 30°. It is further contemplated that the centerline (CL) of the gap cooling opening 184 can be locally parallel to the combustor liner 142 at the gap 173.

The cooling openings 174 fluidly connect the cooling plenum 182 directly to the deflector chamber 170. The gap cooling opening 184 can fluidly connect the cooling plenum 182 directly to the combustion chamber 144. It should be understood that the cooling openings 174 and the gap cooling opening 184 can be multiple cooling openings, or multiple rows and/or columns of cooling openings.

The at least one cooling opening 174 and the gap cooling opening 184 as described herein can be subject to the full extent of a pressure drop between the combustor inlet 152 and the combustion chamber 144. This pressure drop can produce high exit velocities of the cooling air (C2) within the deflector chamber 170, depending on the shape of the cooling opening 174, 184. A high exit velocity can potentially cause hot gas to become ingested into the deflector chamber 170 causing the wall 162 of the fuel dome 160 to heat up, especially in the case of a larger deflector chamber 170. Forming at least one cooling opening, by way of non-limiting example the gap cooling opening 184 can extend between an inlet 178 and a diffuser shape outlet 180 to reduce the exit velocity of the cooling air (C2). It should be understood that while a diffuser shape outlet 180 is illustrated for the gap cooling opening 184, it can also be implemented in any of the at least one cooling openings 174 described herein and is not meant to be limiting. As the cooling air (C2) exits, the velocity is reduced and coverage of the chamber outlet 172 increased, reducing the possibility of backward ingestion into the deflector chamber 170.

The method 100, as described herein can further include emitting the cooling air (C2) through at least one cooling opening, by way of non-limiting example the gap cooling opening 184, directly onto the inner surface 43. The emitting the cooling air (C2) can further include emitting the cooling air through a diffuser shape outlet 180 and reducing the velocity of the emitted cooling air (C2).

Figure 6:
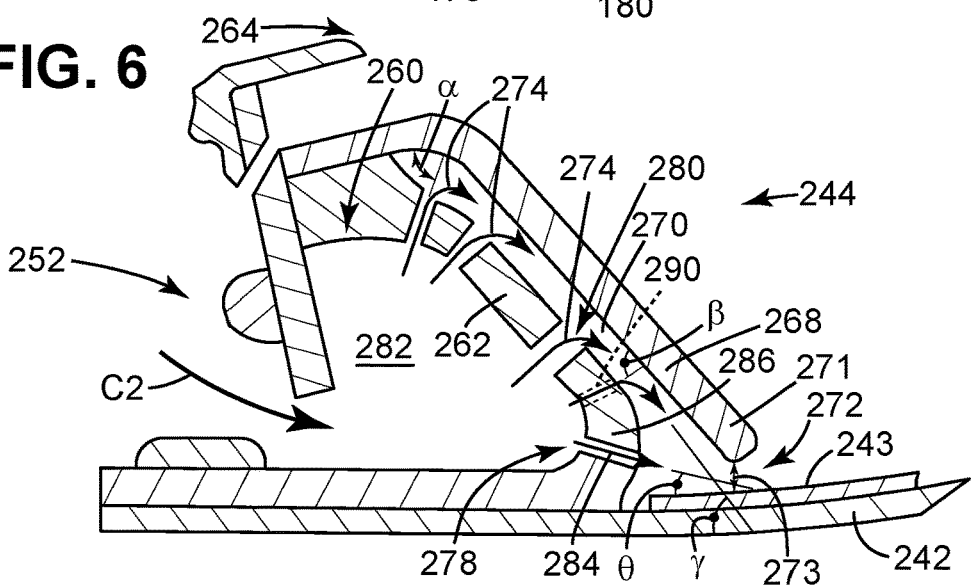
FIG. 6 is an enlarged view of a portion of the combustor assembly of FIG. 2 according to yet another aspect of the disclosure discussed herein.

FIG. 6 is an enlarged portion of FIG. 2 with a fuel dome 260 according to another aspect of the disclosure discussed herein. The fuel dome 260 is substantially similar to the fuel dome 160 of FIG. 5. Like parts will therefore be identified with like numerals increased by 100, with it being understood that the description of the like parts of the fuel dome 160 applies to the fuel dome 260 unless otherwise noted.

A deflector 268 extends outward from a dome inlet 264 and is spaced from a wall 162 of the fuel dome 260 to define a deflector chamber 270. At least one cooling opening 174 fluidly connects a cooling plenum 282 to the deflector chamber 270 through the wall 262. The at least one cooling opening 274 can have a centerline that intersects the deflector 268 with an angle of intersection α that is between 0 and 90°.

A gap cooling opening 284 is formed at a rounded end 286 of the wall 262 of the fuel dome 260. The gap cooling opening 284 can have a centerline that intersects the liner 242 at an inner surface angle θ ranging from 0 and 90°, and is preferably between 0° and 30°. At least one staggered cooling opening 290, illustrated in phantom, is formed in the wall 262 in a staggered pattern with respect to the gap cooling opening 284. Both the gap cooling opening 284 and the staggered cooling opening 290 define centerlines (CL) that converge with each other, and are non-parallel. Furthermore, the centerline (CL) of the staggered cooling opening 290 can have an angle of intersection β with the deflector 268 ranging from 0 to 90°. The cooling air (C2) can turn within the deflection chamber 270 and hit the inner surface 243 of the liner 242 at another inner surface angle γ, greater than the inner surface angle θ but less than 90°.

Since the at least one cooling opening 274 is subject to the full extent of a pressure drop as described herein, the at least one staggered cooling opening 290 can define a centerline that is misaligned with the centerline of one or both the at least one cooling opening 274 or the gap cooling opening 284. The misalignment can produce differing angles at which cooling air (C2) hits the inner surface 243 of the liner 242 helping to increase coverage of the chamber outlet 272 and reduce ingestion.

The method 100, as described herein can further include emitting the cooling air (C2) through a first cooling opening at a first angle. The first cooling opening can be either the at least one cooling opening 274 or the gap cooling opening 284, or both. The first angle can be either the angle of intersection α or the inner surface angle θ, or both. The emitting of cooling air (C2) is simultaneously emitting through a second cooling opening, the staggered cooling opening 290, at a second angle, the angle of intersection β. Furthermore, the cooling air (C2) can also deflect along the inner surface 243 at varying angles, by way of non-limiting example the inner surface angles θ, γ.

FIG. 7 is an enlarged portion of FIG. 2 with a fuel dome 360 according to another aspect of the disclosure discussed herein. The fuel dome 360 is substantially similar to the fuel dome 160 of FIG. 5. Like parts will therefore be identified with like numerals increased by 200, with it being understood that the description of the like parts of the fuel dome 160 applies to the fuel dome 360 unless otherwise noted.

A wall 362 of the fuel dome 360 terminates at an inner surface 243 of an inner liner 242 to define a rounded end 386 of a cooling plenum 382. A baffle 392 can extend across the rounded end 286 of the cooling plenum 282 to define an intermediary plenum 394 within the cooling plenum 382. At least one baffle opening 396, illustrated in phantom, can be provided in the baffle 392 to fluidly connect the cooling plenum 382 to the intermediary plenum 394. A gap cooling opening 384 can be provided in the wall 362 at the rounded end 386 to fluidly connect the intermediary plenum 394 to a combustion chamber 344. An inlet 378 of the gap cooling opening 384 is misaligned with an outlet 398 of the at least one baffle opening 396.

Since the at least one cooling opening 374 is subject to the full extent of a pressure drop as described herein, providing the baffle 392 upstream of at least one cooling opening 374, by way of non-limiting example the gap cooling opening 384, reduces a pressure drop across the gap cooling opening 384 and at the same time also reduces an exit velocity of cooling air (C2) from the gap cooling opening 384. It is contemplated that the at least one baffle opening 396 has targeted impinging points between the inlet 378 of the gap cooling opening 384 in order to provide impingement cooling to the wall 362.

The method 100, as described herein, can further include impinging a cooling air (C2) onto the wall 362 of the fuel dome 360 through at least one baffle opening 396 and then emitting the cooling air (C2) through at least one cooling opening, by way of non-limiting example the gap cooling opening 384, directly onto the inner surface 343.

It should be understood that any combination of the implementation of the cooling openings as described herein is contemplated and that the methods and implementations depicted are for illustrative purposes and not meant to be limiting. The cooling openings as discussed herein can be formed with conventional machining, non-conventional machining (EDM, laser, etc.) or additive manufacturing.

Benefits associated with the cooling openings as described herein are best illustrated with respect to a conventional forward nugget in a combustion liner. A conventional forward nugget can be used to start film on the combustion liner and typically requires a large cooling flow budget and is not effective under some circumstances, for example, when strong swirling flow exists. Eliminating a conventional nugget in the combustor liner increases efficiency and increases a cost benefit for manufacturing.

For liners without a forward nugget to start film, the cooling openings as discussed herein can be formed in a row or multiple rows of cooling openings on the dome wall to start a cooling film on the liner. The cooling openings as described herein are formed such that the cooling air turns without impinging on the deflector and moves out of the deflector chamber to form a film on the liner.

Cooling openings, including the gap cooling openings and staggered cooling openings as described herein, start a cooling film on the liner in order to prevent liner overheating and increase durability. A pressure drop and exit velocity of the cooling air from the cooling openings described herein are controlled to prevent hot gas ingestion in order to maintain durability of the deflector. Forming cooling openings with a diffuser end and alternating cooling openings, such as the staggered cooling openings, to create differing angles of intersection with the inner surface of the liner can help to reduce ingestion because of the pressure drop. Providing baffle openings can help to cool the wall of the dome and prevent overheating in the event hot gas ingestion occurs.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor assembly for a turbine engine, the combustor assembly comprising:
   a combustor liner defining a combustion chamber with an inlet and an outlet;
   a fuel dome located in the inlet and having a wall terminating at the combustor liner to define a terminal end adjacent at least a portion of the combustor liner;
   a deflector overlying and spaced from at least a portion of the wall and the combustor liner to define a deflector chamber opening onto the combustor liner;
   a cooling opening formed in the terminal end of the wall; and
   at least one additional cooling opening provided in the wall and opening into the deflector chamber;
   wherein the deflector terminates in a tip spaced downstream of the terminal end of the wall and radially from the combustor liner to form a gap between the tip and the combustor liner that defines the outlet for the deflector chamber.

2. The combustor assembly of claim 1 wherein the cooling opening is a gap cooling opening passing through the gap.

3. The combustor assembly of claim 2 further comprising a staggered cooling opening in the wall, with the staggered cooling opening having a centerline that is locally non-parallel with the centerline of the gap cooling opening.

4. The combustor of claim 3 wherein at least one of the cooling opening, gap cooling opening, or staggered cooling opening have a diffuser shaped outlet.

5. The combustor assembly of claim 1 wherein at least a portion of the fuel dome defines a cooling plenum upstream of the wall and a baffle within the cooling plenum and defining an intermediary plenum between the cooling plenum and the combustion chamber wherein at least one baffle opening is in the baffle.

6. The combustor assembly of claim 5 wherein each of the wall and the deflector form the same acute angle with the combustor liner.

7. The combustor assembly of claim 1 wherein the at least one additional cooling opening is multiple cooling openings in the wall that have outlets opening into the deflector chamber.

8. The combustor assembly of claim 1 wherein the combustor liner and fuel dome are annular about a centerline of the turbine engine.

9. The combustor assembly of claim 1 wherein the cooling opening has a diffuser shape.

10. The combustor assembly of claim 1 wherein at least a portion of the fuel dome defines a cooling plenum upstream of the wall and a baffle extends across the terminal end to define an intermediary plenum between the cooling plenum and the combustion chamber wherein at least one baffle opening is in the baffle and the cooling opening is in fluid communication with the intermediary plenum.

11. A turbine engine comprising:
    an engine core having a compressor, a combustor assembly, and a turbine, arranged in a serial, axial flow relationship;
    a combustor liner at least partially defining the combustor assembly and having a combustion chamber with an inlet and an outlet;
    a fuel dome located in the inlet and having a wall adjacent at least a portion of the combustor liner and terminating at the combustor liner to define a terminal end;
    a deflector overlying and spaced from at least a portion of the wall and the combustor liner to define a deflector chamber opening onto the combustor liner;
    a cooling opening formed in the terminal end of the wall; and
    at least one additional cooling opening provided in the wall and opening into the deflector chamber;
    wherein the deflector terminates in a tip spaced downstream of the terminal end of the wall and radially from the combustor liner to form a gap between the tip and the combustor liner that defines the outlet for the deflector chamber.

12. The turbine engine of claim 11 wherein the cooling opening formed at the terminal end is a gap cooling opening having a centerline passing through the gap.

13. The turbine engine of claim 12 further comprising a staggered cooling opening in the wall, with the staggered cooling opening having a centerline that is locally non-parallel with the centerline of the gap cooling opening.

14. The turbine engine of claim 13 wherein at least one of the cooling opening, gap cooling opening, or staggered cooling opening have a diffuser shaped outlet.

15. The turbine engine of claim 11 wherein at least a portion of the fuel dome defines a cooling plenum upstream of the wall and a baffle upstream within the cooling plenum and defining an intermediary plenum between the cooling plenum and the combustion chamber wherein at least one baffle opening is in the baffle.

16. The turbine engine of claim 11 wherein the at least one additional cooling opening is multiple cooling openings in the wall that have outlets opening into the deflector chamber.

17. A method of cooling an inner surface of a combustor liner defining a combustion chamber supplied fuel by a fuel dome, the method comprising:
    flowing cooling air within a deflector chamber defined by a deflector terminating in a tip spaced downstream of a terminal end of the fuel dome and radially from the combustor liner to form a gap;
    emitting cooling air into the combustion chamber from the deflector chamber;

emitting cooling air into the combustion chamber from a cooling opening formed in a wall forming the terminal end of the fuel dome; and deflecting the emitted cooling air along the inner surface.

18. The method of claim 17 further comprising emitting the cooling air through at least one additional cooling opening formed in the fuel dome and turning the cooling air to flow within the deflector chamber.

19. The method of claim 17 wherein the emitting cooling air further comprises emitting cooling air through a chamber outlet to form a cooling film along the inner surface.

20. The method of claim 17 further comprising impinging cooling air onto a wall of the fuel dome through at least one baffle opening.

* * * * *